US008346865B1

(12) United States Patent
Lin et al.

(10) Patent No.: US 8,346,865 B1
(45) Date of Patent: Jan. 1, 2013

(54) ON ONLINE NETWORKING SYSTEM AND METHOD FOR DEPICTING VIEWS ASSOCIATED WITH AN ENTITY

(76) Inventors: Charles Yi-chi Lin, New York, NY (US); Jennifer B. Lowe, Redlands, CA (US)

(*) Notice: Subject to any disclaimer, the term of this patent is extended or adjusted under 35 U.S.C. 154(b) by 0 days.

(21) Appl. No.: 12/389,278

(22) Filed: Feb. 19, 2009

Related U.S. Application Data

(60) Provisional application No. 61/066,397, filed on Feb. 19, 2008.

(51) Int. Cl.
*G06F 15/16* (2006.01)

(52) U.S. Cl. ....................................................... 709/204

(58) Field of Classification Search .................. None
See application file for complete search history.

(56) References Cited

U.S. PATENT DOCUMENTS

| | | | |
|---|---|---|---|
| 2005/0177385 A1* | 8/2005 | Hull et al. | 705/1 |
| 2008/0052162 A1* | 2/2008 | Wood | 705/14 |
| 2008/0120390 A1* | 5/2008 | Robinson et al. | 709/207 |
| 2008/0177618 A1* | 7/2008 | Funge et al. | 705/10 |
| 2008/0189169 A1* | 8/2008 | Turpin et al. | 705/10 |

OTHER PUBLICATIONS

Friendster who's viewed me?, Yahoo! Answers, 2007.*
Metz, Rachel, Friendster Outs Voyeurs, Oct. 7, 2005, Wired, http://wired.com/culture/lifestyle/news/2005/10/69106.*

* cited by examiner

*Primary Examiner* — Ario Etienne
*Assistant Examiner* — Clayton R Williams
(74) *Attorney, Agent, or Firm* — Silicon Edge Law Group LLP; Thomas Lathram

(57) ABSTRACT

An online networking system and method for depicting views associated with an entity are presented. An entity profile data structure associated with an entity such as a user or a business is created that defines an entity internal view and a plurality of entity external views. The entity internal view includes entity external view controls for defining entity external views. The entity internal view depicts information associated with members and visitors who visit the entity external views in one embodiment. The entity can define an entity external view to be of a type selected from a group of view types consisting of a family, social and business type, and can define an entity external view to have an access level type selected from a group of access level types consisting of public, private and secret in one embodiment. The entity external view controls allow the entity to select tools such as a media album for displaying media such as photographs and video clips, and to create a tool list. Attributes of a tool are determined via the entity external view controls, and the location of a tool in an entity external view is determined by the tool's location in the tool list, in one embodiment.

28 Claims, 5 Drawing Sheets

ON ONLINE NETWORKING SYSTEM AND METHOD FOR DEPICTING VIEWS ASSOCIATED WITH AN ENTITY

BACKGROUND

Online networking has grown dramatically in popularity in recent years. Online networking websites allow entities such as an individual user or a business to display information relating to the entity and to interact with others who may have like interests. A user, for example, will register or open an account at an online networking site and will define a profile. The user will then add personal data and perhaps media such as photographs or video clips to the profile in order to present a view of information about the user to others, who may then interact with the user in various ways, for example by exchanging comments or email.

In order to attract a sufficient number of users to make the site attractive to others, the site must provide a variety of features and functionality to make the display and exchange of information interesting and useful, and yet the site must be simple and easy to use. Online networking sites invariably provide for a single profile per account and a single view of the profile. If a user wants to present more than one view of the user's information, the user must open multiple accounts.

However, users often have a variety of areas of interest and relationships of different types and degrees of intimacy. For example, a user often has set of close family relationships, a number of social friends and acquaintances, a group of contacts with whom the user may want to interact in connection with a hobby or special area of interest, and business relationships with customers, fellow employees and others. Similarly, a company or business entity may have different types of relationships and areas of interest. The term entity is used broadly herein to refer to an entity of any kind including without limitation an individual user and a fictitious person such as a corporation, partnership or sole proprietorship. All entities with whom a user or other entity may have a relationship are referred to broadly herein as friends. Opening a separate account and maintaining a separate profile for each area of interest and set or subset of friends is difficult and time consuming, and many users and other entities simply don't take the time or make the effort to do so, thereby losing the potential benefits of online networking in each of these areas.

BRIEF DESCRIPTION OF THE DRAWINGS

The subject matter disclosed in this specification is illustrated by way of example, and not by way of limitation, in the figures of the accompanying drawings, which are incorporated into and constitute a part of this specification, and in which like reference numerals refer to similar elements.

DETAILED DESCRIPTION

The following detailed description presents an online networking system and method for depicting views associated with an entity in accordance with one embodiment of the invention. Those of ordinary skill in the art will realize that this detailed description is illustrative only, and is not intended to be in any way limiting. Other embodiments will readily suggest themselves to skilled persons having the benefit of this disclosure. For purposes of clarity, not all routine features and components of the present invention are shown or described. A wide variety of implementations are possible, and the method steps, data structures and other elements may be implemented using a variety of computing platforms, operating systems, computer programs, communication, storage and processing mechanisms, and purpose-specific and programmable devices. Each implementation may entail numerous decisions about features and components in the course of development that are specific to that implementation. Such development may be difficult and time-consuming, yet it would be routine to one of ordinary skill in the art having the benefit of this disclosure.

Figure 1:
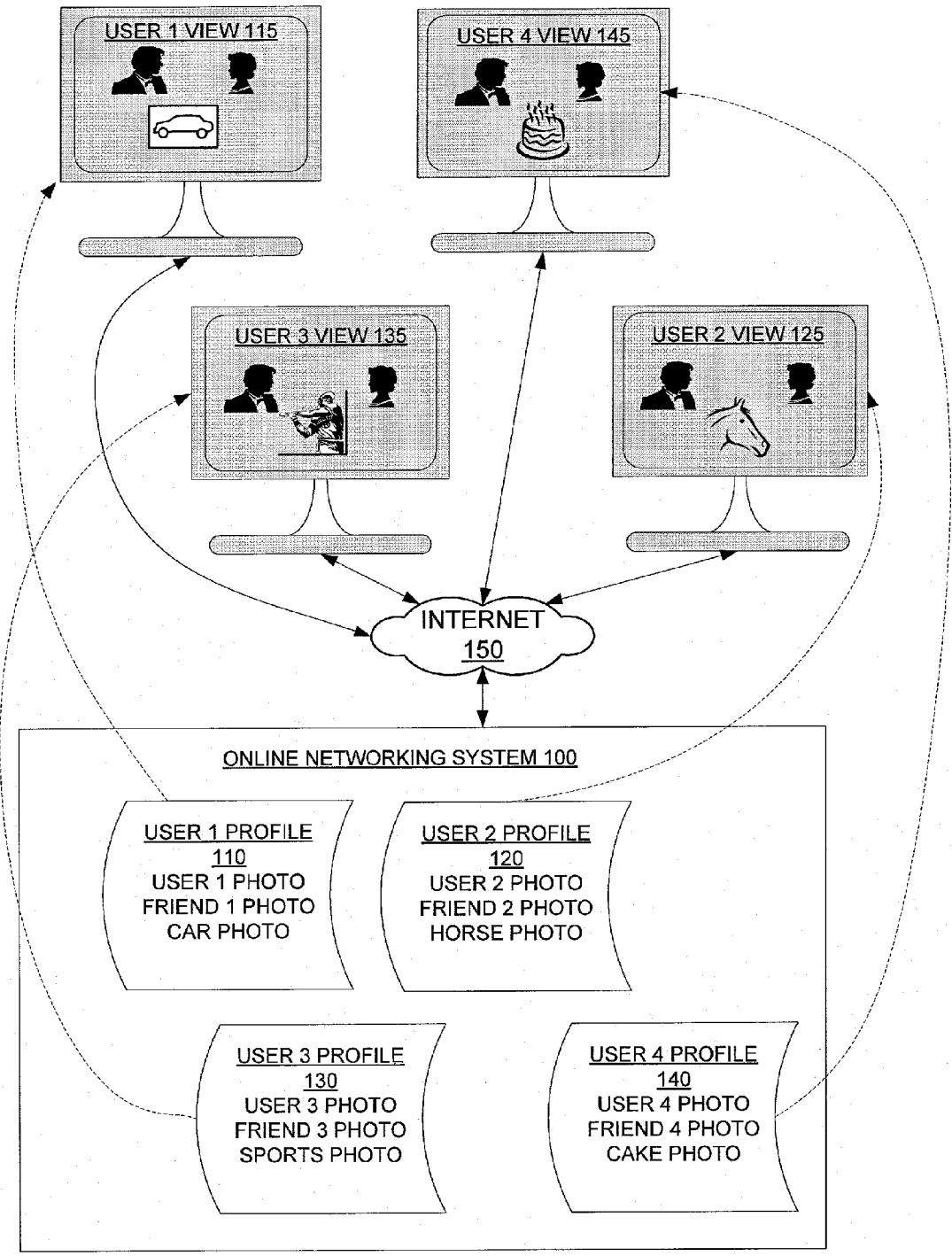
FIG. 1 depicts a conventional online networking system in which each of four users maintains a single account with a single profile containing information displayed in a user view in response to a request made by an individual or other entity over the Internet.

FIG. 1 depicts a conventional online networking system 100. A user 1 has created a user 1 profile 110 in the online networking system 100 that includes information associated with the user. In the depicted user 1 profile 110, the information associated with user 1 includes a user 1 photo, a friend 1 photo and a car photo. In response to a request received by the online networking system 100 from a client computer owned by a requester via the Internet 150, the information associated with user 1 in the user 1 profile is displayed in a user 1 view 115 on the requester's client computer. Similarly, user 2 has created a user 2 profile 120 that includes information associated with user 2. The information associated with user 2 includes a user 2 photo, a friend 2 photo and a horse photo. In response to a request received by the online networking system 100 from a client computer owned by a requester via the Internet 150, the information associated with user 2 in the user 2 profile is displayed in a user 2 view 125 on the requester's client computer. User 3 has created a user 3 profile 130 that includes information associated with user 3. The information associated with user 3 includes a user 3 photo, a friend 3 photo and a sports photo. In response to a request received by the online networking system 100 from a client computer owned by a requester via the Internet 150, the information associated with user 3 in the user 3 profile is displayed in a user 3 view 135 on the requester's client computer. Finally, user 4 has created a user 4 profile 140 that includes information associated with user 4. The information associated with user 4 includes a user 4 photo, a friend 4 photo and a cake photo. In response to a request received by the online networking system 100 from a client computer owned by a requester via the Internet 150, the information associated with user 4 in the user 4 profile is displayed in a user 4 view 145 on the requester's client computer.

In each instance, the respective user has created a single profile which includes information associated with the user. The information associated with the user may be displayed in a single user view. If the respective user wants to display a different view, the user must open a separate account and create a separate user profile. Opening separate accounts, and creating and maintaining multiple separate profiles, may require significant amounts of time and effort, and users may be discouraged from taking advantage of the potential benefits of being able to display different views relating to different areas of interest or different sets of friends.

Figure 2:
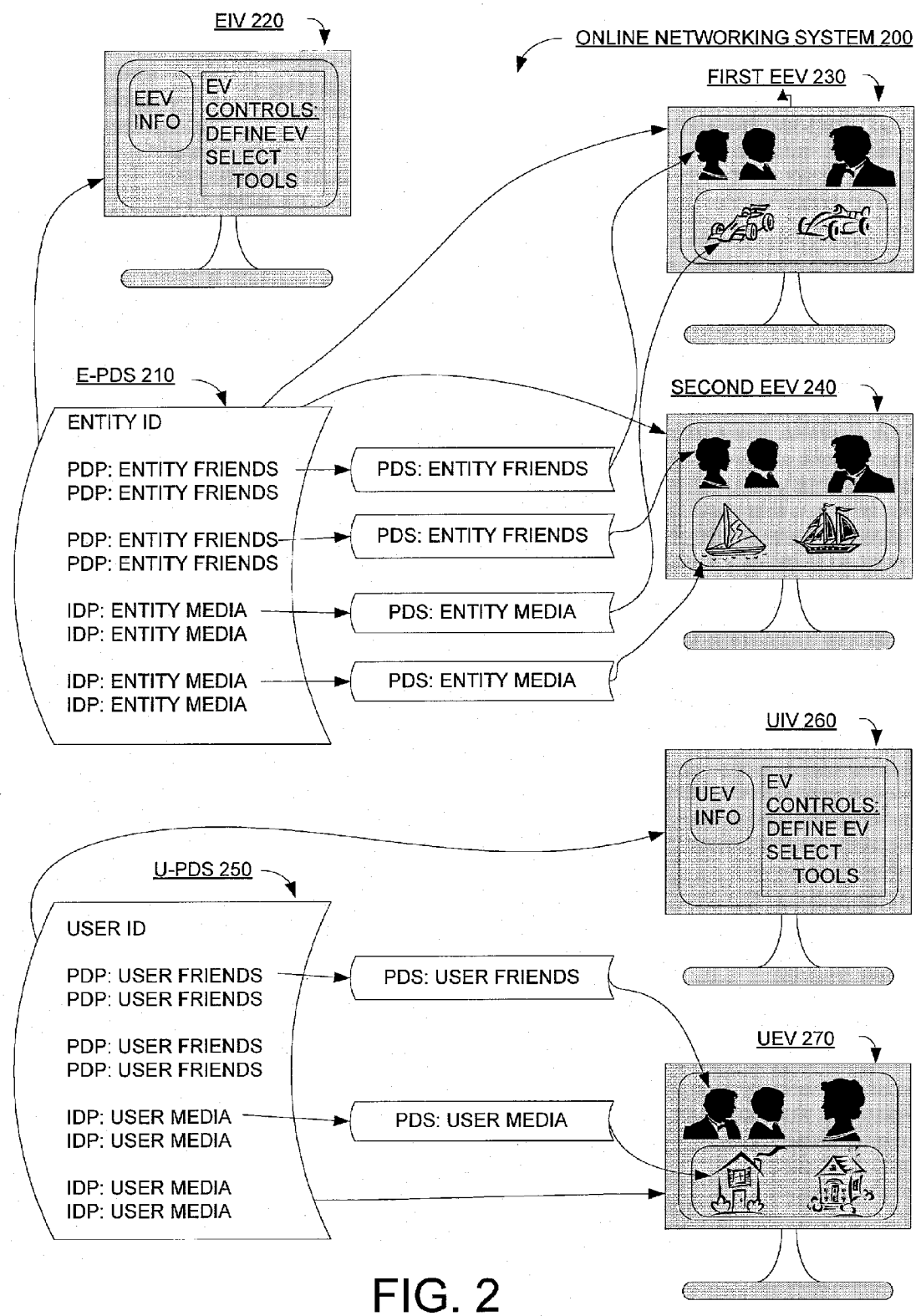
FIG. 2 depicts an online networking system in accordance with one embodiment of the invention. The Internet or other network connection as well as a number of other details are omitted for simplicity. An entity profile data structure is depicted which defines an entity internal view (EIV) and first and second entity external views (First EEV and Second EEV). A user profile data structure is also depicted which defines a user internal view (UIV) and a user external view (UEV).

FIG. 2 depicts an online networking system 200 in accordance with one embodiment of the invention. An entity profile data structure (E-PDS 210) is depicted. The E-PDS 210 includes an entity identifier (ENTITY ID), a plurality of profile data pointers (PDP: ENTITY FRIENDS) to profile data structures (PDS: ENTITY FRIENDS) associated with entity friends, and a plurality of item data pointers (IDP: ENTITY MEDIA) to item data structures (IDS: ENTITY MEDIA) associated with entity media. The E-PDS 210 defines an entity internal view (EIV 220), a first entity external view (FIRST EEV 230) and a second entity external view (SECOND EEV 240). The EIV 220 depicts information associated with the entity external views (EEV INFO) and further depicts entity view controls operable to define entity external views (EV CONTROLS). The FIRST EEV 230 depicts a representation of the entity, representations of a first subset of the entity friends, and a first subset of the entity media. In one embodiment, the FIRST EEV 230 is a view type selected among a group of view types consisting of family, social and business view types. The FIRST EEV 230 also has a permission or access level type selected from among a group of access level types consisting of public, private and secret in one embodiment. The SECOND EEV 240 depicts a representation of the entity, representations of a second subset of the entity friends, and a second subset of the entity media.

A user profile data structure (U-PDS 250) is also depicted in FIG. 2. In the depicted embodiment, the user is among the first subset of the entity friends. The U-PDS 250 includes a user identifier (USER ID), a plurality of profile data pointers (PDP: USER FRIENDS) to profile data structures (PDS: USER FRIENDS) associated with user friends, and a plurality of item data pointers (IDP: USER MEDIA) to item data structures (IDS: USER MEDIA) associated with user media. In one embodiment, the entity is among the subset of user friends. The U-PDS 250 defines a user internal view (UIV 260) and a user external view (UEV 270). The UIV 260 depicts information associated with the user external views (EEV INFO) and further depicts user view controls operable to define user external views (EV CONTROLS). The UEV 270 depicts a representation of the user, representations of a subset of the user friends, and a first subset of the user media.

In the embodiment of the invention depicted in FIG. 2, when the entity logs in to the online networking system 200, the EIV 220 is displayed to the entity. In one embodiment, the EIV 220 is displayed only to the entity. The EIV 220 depicts information associated with the entity external views (EEV INFO). The EEV INFO depicted by the EIV 220 might include, for example, information collected and stored in the E-PDS 210 about members who have registered or opened an account at the online networking system 200 or visitors to the site, who have accessed the FIRST EEV 230, or who have accessed the FIRST EEV 230 and the SECOND EEV 240. Other examples of EEV INFO will readily occur to one of ordinary skill in the art. The EIV 220 also depicts entity external view controls (EV CONTROLS) that the entity can utilize to define entity external views. In response to a request received by the online networking system 200 from a member or visitor, the FIRST EEV 230 is depicted to the member or visitor. The FIRST EEV 230 includes representations, via profile data pointers (PDP: ENTITY FRIENDS) to profile data structures (PDS: ENTITY FRIENDS) of a first subset of the entity's friends associated with the FIRST EEV 230, and entity media, via item data pointers (IDP: ENTITY MEDIA) to item data structures (IDS: ENTITY MEDIA) of entity media such as car photos associated with the FIRST EEV 230. In response to a request received by the online networking system 200 from a member or visitor, the SECOND EEV 240 is depicted to the member or visitor. The SECOND EEV 240 includes representations, via profile data pointers (PDP: ENTITY FRIENDS) to profile data structures (PDS: ENTITY FRIENDS) of a second subset of the entity's friends associated with the SECOND EEV 240, and entity media, via item data pointers (IDP: ENTITY MEDIA) to item data structures (IDS: ENTITY MEDIA) of entity media such as boat photos associated with the SECOND EEV 240.

In the embodiment of the invention depicted in FIG. 2, when the user logs in to the online networking system 200, the UIV 260 is displayed to the user. The UIV 260 depicts information associated with the user external views (UEV INFO). The UIV 260 also depicts user external view controls (EV CONTROLS) that the user can utilize to define user external views. In response to a request received by the online networking system 200 from a member or visitor, the UEV 270 is depicted to the member or visitor. The UEV 270 includes representations, via profile data pointers (PDP: USER FRIENDS) to profile data structures (PDS: USER FRIENDS) of a first subset of user friends associated with the UEV 270, and user media, via item data pointers (IDP: USER MEDIA) to item data structures (IDS: USER MEDIA) of user media such as house photos associated with the UEV 270.

The embodiment of the invention depicted in FIG. 2 allows the entity to define, including modify, a plurality of views from a single account utilizing a single profile. In addition to the depicted data pointers, a variety of information associated with the entity can be included in the profile data structure E-PDS 210. Using the external view controls depicted in the EIV 220, the entity can define multiple views. In one embodiment, the entity can choose a type of view to define. For example, the entity can define a family, social or business view. An entity such as a user might define a family view with thumbnails or other representations of members of the user's immediate family and photos of the user's child's birthday party. The user might define a social view with thumbnails or other representations of people who live in the user's neighborhood and photos of a neighborhood barbecue. An entity might also choose to define multiple views of the same view type. For example, an entity such as a company might define a business view for its customers and another business view for its vendors or supply chain.

In one embodiment, the entity can choose a permission or access level for each view. For example, the entity can define a public view which is accessible by all members and visitors to the site. This access level might be used for a business view defined by an entity seeking to obtain new customers. The entity can also define a private view. A private view is one in which the fact that the view exists is shown by information depicted in another view, but the private view can only be accessed by entities that have been invited to become included among a subset of the entity friends associated with the private view. A private view might be used, for example, by a group of close friends who wish to exchange information among them that they do not want others to see, or by a professional such as a lawyer or doctor who must exchange confidential information with clients or patients. The entity can also define a secret view. A secret view is one in which the fact that the view exists is not shown to or known by others except those entities that are invited to be included among a subset of the entity friends associated with the secret view.

Figure 3:
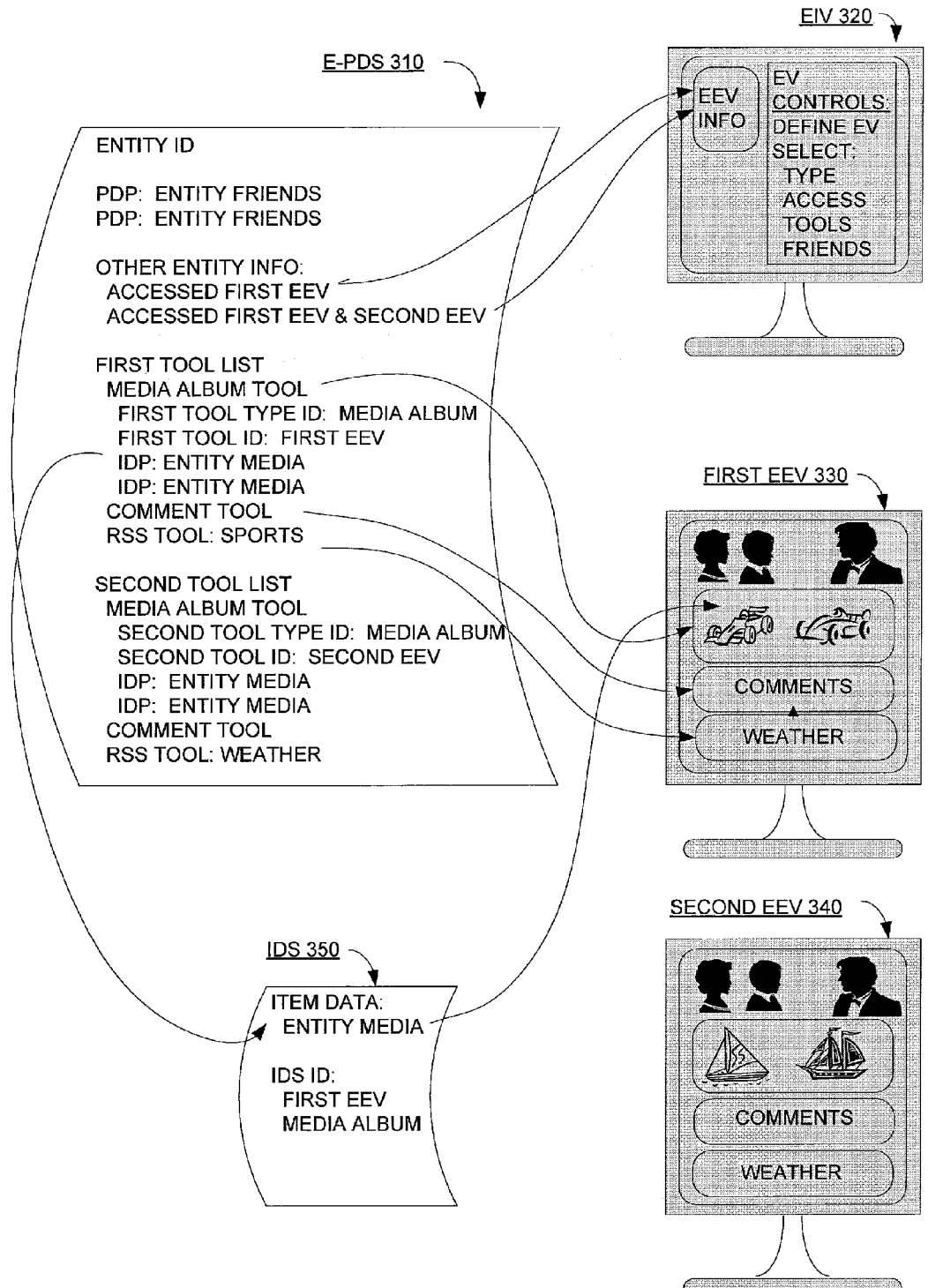
FIG. 3 depicts an entity profile data structure (E-PDS), an item data structure (IDS), an entity internal view (EIV) and first and second entity external views (FIRST EEV and SECOND EEV, respectively) in accordance with one embodiment of the invention.

FIG. 3 depicts an entity profile data structure (E-PDS 310) in accordance with one embodiment of the invention. The E-PDS 310 is also the E-PDS 210 of FIG. 2 in one embodiment. The E-PDS 310 includes an entity identifier (ENTITY ID) and profile data pointer (PDP: ENTITY FRIENDS) that point to profile data structures (not shown) for a plurality of entity friends. The E-PDS 310 also includes information about other entities such as members and visitors who accessed the first entity external view (FIRST EEV 330), and information about members and visitors who accessed either or both of the FIRST EEV 330 and the second entity external view (SECOND EEV 340), in one embodiment. The EP-PDS 310 includes a list of tools (FIRST TOOL LIST) associated with the FIRST EEV 330, the tools to depict item data in the FIRST EEV 330. The first tool in the depicted FIRST TOOL LIST is a media album tool (MEDIA ALBUM TOOL) that includes a tool type identifier (FIRST TOOL TYPE ID: MEDIA ALBUM), an identifier that associates the first tool with the FIRST EEV 330 (FIRST TOOL ID: FIRST EEV), and an item data pointer (IDP: ENTITY MEDIA) that points to an item data structure (IDS 350) that includes item data (ITEM DATA: ENTITY MEDIA) associated with the entity. In the depicted embodiment, the IDS 350 also includes an identifier (IDS ID: FIRST EEV MEDIA ALBUM) that associates the IDS 350 with the first tool (MEDIA ALBUM TOOL). The first tool list includes a second tool that is of the comment tool type (COMMENT TOOL). Although not shown, the comment tool includes an identifier that identifies the second tool as of the comment tool type. In another embodiment, the second tool is of the media album type, and includes an identifier that identifies the second tool as of the same tool type as the first tool. In the embodiment depicted in FIG. 3, the E-PDS 310 includes a second tool list (SECOND TOOL LIST) associated with the SECOND EEV 340, the second tool list including an identifier that associates the second tool list with the SECOND EEV 340 (SECOND TOOL ID: SECOND EEV).

Figure 4A:
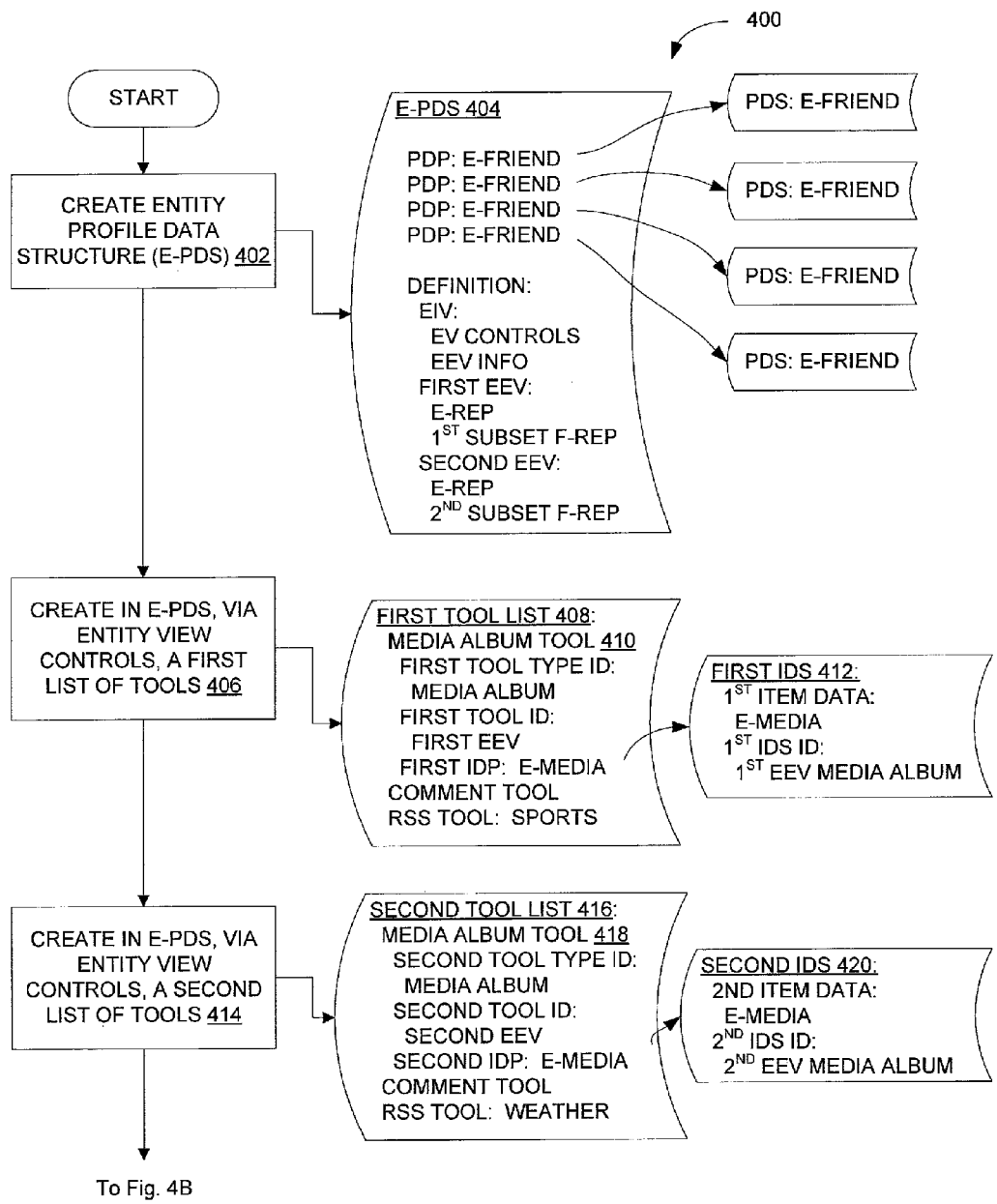
FIGS. 4A-B constitute a flow chart that depicts the steps for creating an entity profile data structure (E-PDS), creating a first and second list of tools, and in response to requests from a user, depicting a first entity external view (FIRST EEV) and a second entity external view (SECOND EEV), in accordance with one embodiment of the invention.
Figure 4B:
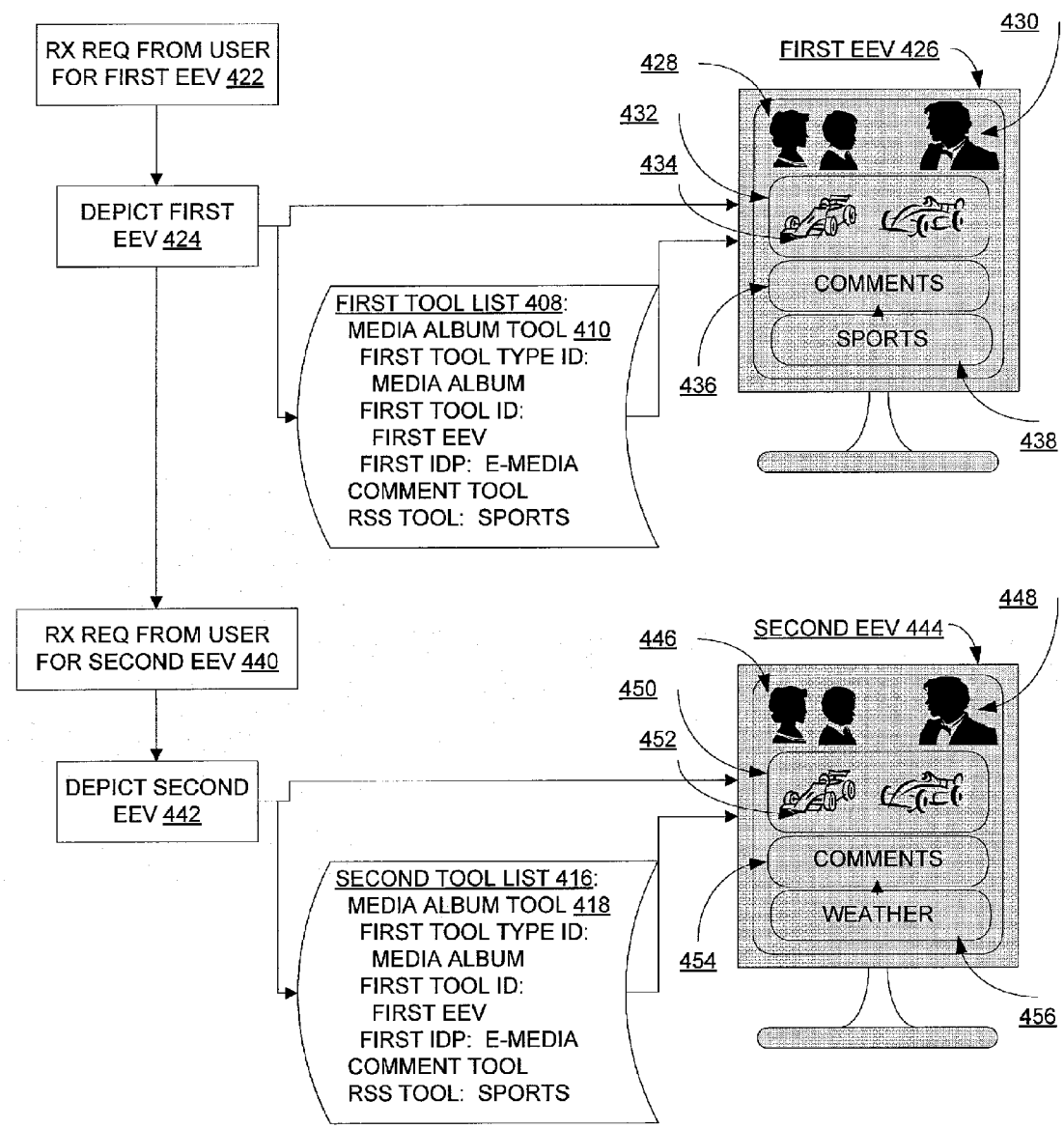

FIGS. 4A-B constitute a flow chart that depicts the steps for creating an entity profile data structure (E-PDS), creating a first and second list of tools, and in response to requests from a user, depicting a first entity external view (FIRST EEV) and a second entity external view (SECOND EEV), in accordance with one embodiment of the invention. In the first step (402), an entity profile data structure (E-PDS 404) associated with an entity is defined. The E-PDS 404 includes profile data pointers (PDP: E-FRIEND) to profile data structures (PDS: E-FRIEND) for a plurality of entity friends. The E-PDS 404 further defines an entity internal view (EIV) associated with the entity, the EIV depicting entity external view controls (EV CONTROLS) operable to define, including modify, entity external views. The E-PDS defines a first entity external view (FIRST EEV) associated with the entity, the FIRST EEV depicting a representation of the entity (E-REP) and representations of a first subset of the entity friends ($1^{st}$ SUBSET F-REP). The E-PDS 404 also defines a second entity external view (SECOND EEV), the SECOND EEV depicting a representation of the entity (E-REP) and representations of a second subset of the entity friends ($2^{nd}$ SUBSET F-REP).

In the next step (406), a first list of tools (FIRST TOOL LIST 408) is created in the E-PDS 404 via the EV CONTROLS. The first tool on the list of tools (MEDIA ALBUM TOOL 410) includes a first tool type identifier (FIRST TOOL TYPE ID: MEDIA ALBUM), a first tool identifier that associates the first tool with the FIRST EEV (FIRST TOOL ID: FIRST EEV), and a first item data pointer (FIRST IDP: E-MEDIA) that points to a first item data structure (FIRST IDS 412) that includes first item data associated with the entity ($1^{st}$ ITEM DATA: E-MEDIA). The FIRST IDS 412 also includes an identifier ($1^{st}$ IDS ID: $1^{st}$ EEV MEDIA ALBUM) that associates the FIRST IDS 412 with the first tool (MEDIA ALBUM TOOL 410). The FIRST TOOL LIST 408 includes a comment tool (COMMENT TOOL) and an RSS tool that depicts a sports feed (RSS TOOL: SPORTS).

Next (step 414), a second list of tools (SECOND TOOL LIST 416) is created in the E-PDS 404 via the EV CONTROLS. The second tool on the list of tools (MEDIA ALBUM TOOL 418) includes a second tool type identifier (SECOND TOOL TYPE ID: MEDIA ALBUM), a second tool identifier that associates the second tool with the SECOND EEV (SECOND TOOL ID: SECOND EEV), and a second item data pointer (SECOND IDP: E-MEDIA) that points to a SECOND item data structure (SECOND IDS 420) that includes second item data associated with the entity (2nd ITEM DATA: E-MEDIA). The SECOND IDS 420 also includes an identifier (2nd IDS ID: 2nd EEV MEDIA ALBUM) that associates the SECOND IDS 420 with the second tool (MEDIA ALBUM TOOL 418). The SECOND TOOL LIST 416 also includes a comment tool (COMMENT TOOL) and an RSS tool that depicts a weather feed (RSS TOOL: WEATHER).

The flow chart then carries over to FIG. 4B. A request is received from a user for the first entity external view (step 422). In response to the request, the first entity external view (FIRST EEV 426) is depicted (step 424). The FIRST EEV 426 depicts a representation of the entity (430) and representations of a first subset of the entity friends (428). A representation (434) of the first item data ($1^{st}$ ITEM DATA: E-MEDIA in the FIRST IDS 412) is depicted in the media album 432 via the first tool (MEDIA ALBUM TOOL 410). Next, a request is received from a user for the second entity external view (step 440). In response to the request, the second entity external view (SECOND EEV 444) is depicted (step 442). The SECOND EEV 444 depicts a representation of the entity (448) and representations of a second subset of the entity friends (446). A representation (452) of the second item data ($2^{nd}$ ITEM DATA: E-MEDIA in the SECOND IDS 420) is depicted in the media album 450 via the second tool (MEDIA ALBUM TOOL 418).

The FIRST EEV 426 depicts comments (436) and an RSS sports feed (438) below the media album (432). Similarly, the SECOND EEV 448 depicts comments (454) and an RSS weather feed (456) below the media album (450). In each instance, the location of these tools in the entity external view is determined by the location of each tool on the list of tools (FIRST TOOL LIST 408 and SECOND TOOL LIST 418, respectively), in the depicted embodiment. The attributes of the first tool (MEDIA ALBUM TOOL 410) and the other tools in the respective entity external views, including the size and location of such tools in the respective entity external views, is configurable via the entity external view controls (EV CONTROLS) in the entity internal view (EIV) in one embodiment.

The SECOND EEV 444 can be a public view, a private view or a secret view according to one embodiment. The SECOND EEV 444 can also be a view of a family type, a social type or a business type according to one embodiment.

In the depicted embodiment, the first tool (MEDIA ALBUM TOOL 410) is a media album and the first item data ($1^{st}$ ITEM DATA E-MEDIA in the FIRST IDS 412) represents a photograph of a car (434). A tool on a tool list can be selected from among a group of tool types, including a media album for displaying media such as photographs, drawings, video clips or other media types, a blog tool, a comments tool, an email tool for sending, receiving and displaying email messages, a bulletins tool, an RSS feed tool, and a calendar tool. Moreover, a tool list can include a plurality of tools of the same tool type. For example, the tool following the first tool (MEDIA ALBUM TOOL 410) on the FIRST TOOL LIST 408 could also be of the media album type instead of the comment type.

The first tool (MEDIA ALBUM TOOL 410) includes a first item data pointer (FIRST IDP: E-MEDIA) that points to a first item data structure (FIRST IDS 412), and the first item data structure (FIRST IDS 412) includes an identifier that associates the item data with the first tool ($1^{st}$ IDS ID: $1^{st}$ EEV Media ALBUM). A tool can include a plurality of item data pointers and the plurality of item data pointers can each include an identifier that associates the item data with the tool. Moreover, a tool can include item data pointers to item data structures that include item data of a different type than the type ordinarily associated with the tool type. For example, as noted above, the first item data ($1^{st}$ ITEM DATA: E-MEDIA) in the first item data structure (FIRST IDS 412) is of the photograph type. However, the item data could also be of a different type. In one embodiment, the item data could be of a calendar event type, and other item data pointers in the first tool could point to item data structures that include item data representing photographs of the calendar event represented by the calendar event item data.

The flexibility and convenience of providing accessibility to multiple entity views from a single profile in accordance with the depicted embodiment support many uses for entity views. For example, an entity could define a view that would be sponsored by a sponsor, and data regarding members and visitors who visit the sponsored site could be collected presented to the sponsor.

From the above description, a number of advantages of the present invention are apparent. An entity such as a user or business can define multiple views of varying types from a single account based on a single profile. The entity can define an appropriate view type for each view in accordance with the nature of the area of interest and subset of friends associated with the view. In addition, the entity can control access to each view by selecting an appropriate access level for each view. Defining views can be accomplished via external view controls depicted in an entity internal view, making management of multiple views convenient and efficient.

Particular embodiments of the invention have been illustrated and described above. One of ordinary skill in the art will realize that the invention may take other forms and embodiments within the scope of the appended claims.

While the present invention has been described in connection with specific embodiments, variations of these embodiments will be obvious to those of ordinary skill in the art. Moreover, the functions of transmitting, storing, managing and retrieving digitized data and information may be accomplished in many different ways using a variety of components and configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. An online networking system comprising:
    a processor operatively coupled to a memory to execute instructions; and wherein the instructions comprise:
    (a) an entity profile data structure associated with an entity, the entity profile data structure including item data pointers to item data structures associated with entity media and profile data pointers to profile data structures associated with a plurality of entity friends, the entity profile data structure further defining:
        (i) an entity internal view, wherein the entity internal view depicts information associated with entity external views and further depicts entity view controls operable to define entity external views;
        (ii) a first entity external view, wherein the first entity external view depicts a representation of the entity, a first subset of the entity media and representations via profile data pointers to profile data structures of a first subset of the entity friends;
        (iii) a second entity external view, wherein the second entity external view depicts a representation of the entity, a second subset of the entity media and representations of a second subset of the entity friends;
    (b) a user profile data structure associated with a user, wherein the user is among the first subset of the entity friends, the user profile data structure including item data pointers to item data structures associated with user media and profile data pointers to profile data structures associated with a plurality of user friends, the user profile data structure further defining:
        (i) a user internal view, wherein the user internal view depicts information associated with a user external view and further depicts user view controls operable to define the user external view; and
        (ii) the user external view, wherein the user external view depicts a representation of the user, a subset of the user media and representations of a subset of the user friends;
    (c) wherein the information associated with entity external views includes an entity identifier and other information associated with another entity that accessed the first entity external view, and wherein the entity identifier and other information is collected and stored in the entity profile data structure.

2. The system of claim 1, wherein the entity is a second user.

3. The system of claim 1, wherein the entity is among the subset of the user friends.

4. The system of claim 1, wherein the first entity external view is a view type selected among a group of view types consisting of family, social and business view types.

5. The system of claim 1, wherein the second entity external view is of the same view type as the first-mentioned entity external view.

6. The system of claim 1, wherein the first entity external view has an access level type selected from among a group of access level types consisting of public, private and secret.

7. The system of claim 1, wherein the information associated with entity external views includes information about other entities that accessed the first and second entity external views.

8. The system of claim 1 wherein the entity view controls are operable to modify an entity external view.

9. The system of claim 1 wherein the entity view controls are operable to define a new entity external view.

10. The system of claim 9, wherein the entity view controls are operable to define a view type for the new entity external view.

11. The system of claim 9, wherein the entity view controls are operable to define an access level type for the new entity external view.

12. The system of claim 1, wherein the entity internal view is displayed only to the entity.

13. The system of claim 1, the entity profile data structure further including a list of tools associated with the first entity external view, the tools to depict item data in the first entity external view, and wherein a first tool on the list of tools includes:
 (a) a tool type identifier;
 (b) an identifier that associates the first tool with the first entity external view; and
 (c) an item data pointer that points to an item data structure that includes item data associated with the entity.

14. The system of claim 13, the item data structure further including an identifier that associates the item data structure with the first tool.

15. The system of claim 13, wherein a second tool on the list of tools includes tool type identifier that identifies the second tool as of the same tool type as the first tool.

16. The system of claim 13, wherein the item data structure further includes a second tool list associated with the second entity external view.

17. A method comprising
 (a) creating an entity profile data structure associated with an entity, the entity profile data structure including profile data pointers to profile data structures for a plurality of entity friends, the entity profile data structure further defining,
  (i) an entity internal view associated with the entity, the entity internal view depicting entity external view controls operable to define entity external views;
  (ii) a first entity external view associated with the entity, the first entity external view depicting a representation of the entity and representations via profile data pointers to profile data structures of a first subset of the entity friends; and
  (iii) a second entity external view associated with the entity, the second entity external view depicting a representation of the entity and representations of a second subset of the entity friends;
 (b) creating in the entity profile data structure, via the entity view controls, a first list of tools associated with the first entity external view, wherein a first tool on the list of tools includes:
  (i) a first tool type identifier;
  (ii) a first tool identifier that associates the first tool with the first entity external view; and
  (iii) a first item data pointer that points to a first item data structure that includes first item data associated with the entity;
 (c) creating in the entity profile data structure, via the entity view controls, a second list of tools associated with the second entity external view, wherein a second tool on the second list of tools includes:
  (i) a second tool type identifier;
  (ii) a second tool identifier that associates the second tool with the second entity external view; and
  (iii) a second item data pointer that points to a second item data structure that includes second item data associated with the entity;
 (d) in response to a request from a user for the first entity external view, depicting a representation of the entity and representations of a first subset of the entity friends, and depicting a representation of the first item data via the first tool; and
 (e) in response to a request from a user for the second entity external view, depicting a representation of the entity and representations of a second subset of the entity friends, and depicting a representation of the second item data via the second tool;
 (f) wherein the entity profile data structure includes a user identifier and other information associated with the user who requested the first entity external view, and wherein the user identifier and other information is collected and stored in the entity profile data structure.

18. The method of claim 17, wherein the first and second tool type identifiers are the same.

19. The method of claim 18, wherein the first tool type is a media album, the first item data represents a first photograph, and the second item data represents a second photograph.

20. The method of claim 17, wherein additional users access the first entity external view, and wherein the entity profile data structure includes data associated with the additional users.

21. The method of claim 19, wherein the data associated with the additional users is presented to the entity in the entity internal view.

22. The method of claim 17, wherein the method includes determining the location of the first tool in the first external view by its location on the first list of tools.

23. The method of claim 17, wherein attributes of the first tool, including size and location of the first tool in the first external view, are configurable via the entity view controls.

24. The method of claim 17, wherein the second entity external view is one of a public view, a private view, and a secret view.

25. The method of claim 17, wherein the first tool includes a plurality of additional item data pointers to item data structures that include item data associated with the entity, and wherein the first item data structure and the plurality of additional item data structures each include an identifier that associates the item data with the first tool.

26. The method of claim 25, wherein the first tool is a media album, the first item data is of the calendar event type, and the plurality of additional item data structures include item data representing photographs of a calendar event represented by the calendar event item data.

27. The method of claim 17, wherein the first tool is sponsored by a sponsor.

28. The method of claim 27, wherein aggregated data associated with users who access item data via the first tool is collected and presented to the sponsor.

* * * * *